US006729249B2

(12) United States Patent  (10) Patent No.: US 6,729,249 B2
Sauder et al.  (45) Date of Patent: May 4, 2004

(54) SEED BELT HOUSING WITH IMPACT ABSORBING MATERIAL TO REDUCE SEED SKIP AND METHOD FOR SAME (75) Inventors: Gregg A. Sauder, Tremont, IL (US); Kenneth R. Dill, Hopedale, IL (US); Don L. Dunlap, Pekin, IL (US); Derek A. Sauder, Tremont, IL (US)

(73) Assignee: Precision Planting, Inc., Tremont, IL (US)

( * ) Notice: Subject to any disclaimer, the term of this patent is extended or adjusted under 35 U.S.C. 154(b) by 0 days.

(21) Appl. No.: 10/092,704

(22) Filed: Mar. 5, 2002

(65) Prior Publication Data

US 2003/0167986 A1 Sep. 11, 2003

(51) Int. Cl.[7] .................................................. A01C 7/18
(52) U.S. Cl. ....................................... 111/177; 111/170
(58) Field of Search .............................. 111/25, 34, 74, 111/77, 170, 177, 178, 183, 184; 221/210, 217, 218, 219, 243, 267

(56) References Cited

U.S. PATENT DOCUMENTS

| 3,308,774 | A | | 3/1967 | Keeton ........................ 111/77 |
|---|---|---|---|---|
| 3,552,601 | A | | 1/1971 | Valentine et al. ........... 221/219 |
| 4,002,266 | A | * | 1/1977 | Beebe ......................... 221/260 |
| 4,009,668 | A | | 3/1977 | Brass et al. ................... 111/85 |
| 4,519,525 | A | * | 5/1985 | Wunschl et al. .............. 111/77 |
| 5,044,147 | A | * | 9/1991 | Klinner ...................... 56/14.6 |
| 5,640,915 | A | * | 6/1997 | Schaffert .................... 111/150 |
| 5,992,338 | A | * | 11/1999 | Romans ...................... 111/171 |
| 6,142,086 | A | * | 11/2000 | Richard ...................... 111/174 |
| 6,237,514 | B1 | * | 5/2001 | Romans ...................... 111/171 |
| 6,269,758 | B1 | * | 8/2001 | Sauder ........................ 111/177 |
| 6,352,042 | B1 | * | 3/2002 | Martin et al. ............... 111/184 |
| 6,581,535 | B2 | * | 6/2003 | Barry et al. ................. 111/181 |

OTHER PUBLICATIONS 7000 and 7100 MaxEmerge Planting Units and Attachments Parts Catalog; John Deere Seeding Group; pp. 46–47.

* cited by examiner

Primary Examiner—Robert E. Pezzuto
Assistant Examiner—Nathan Mammen
(74) Attorney, Agent, or Firm—Larkin Hoffman Daly & Lindgren Ltd.; Thomas J. Oppold (57) ABSTRACT An improved seed belt housing to reduce seed skip and method for same. The seed belt housing having a modified back panel with an area of impact absorbing material disposed at least in the area where the seed normally hits the back panel of the seed belt housing after being discharged by the seed meter. The impact absorbing material having the properties to dampen, absorb, or reduce the amount of bounce or ricochet otherwise experienced by the seed after hitting the back panel of the seed belt housing.

21 Claims, 8 Drawing Sheets

SEED BELT HOUSING WITH IMPACT ABSORBING MATERIAL TO REDUCE SEED SKIP AND METHOD FOR SAME

BACKGROUND OF THE INVENTION

1. Field of the Invention

The present invention relates generally to agricultural seed planters, and more particularly to an improved seed belt housing for minimizing seed skips.

2. Description of Related Art

It is well recognized that uniformity in the spacing of seeds in a seed furrow is essential for maximizing a field's crop yield potential and thus enhancing the profitability of the farmer's operation. Accordingly, it is essential to minimize the occurrence of seed skips, and other causes of inaccurate seed spacing.

Modern agricultural planters use various types of seed metering devices designed to select and discharge individual seeds at regular intervals to ideally achieve this uniformity in seed spacing. One particular type of seed metering device widely used for years on many different makes and models of agricultural planters is known as a "finger-pickup" meter. One of the first commercially successful finger-pickup meters is disclosed in U.S. Pat. No. 3,308,774 to Keeton. The Keeton '774 finger-pickup meter was subsequently improved as disclosed in U.S. Pat. No. 3,552,601 to Hansen et al. The improved finger-pickup meter by Hansen et al. is still widely used today substantially as embodied in the disclosure of the Hansen et al. '601 patent. Further improvements to the Hansen et al. '601 finger-pickup meter are disclosed in U.S. Pat. No. 6,269,758 to Sauder.

The Sauder '758 patent discloses an improved wear resistant backing plate with removable brush inserts and "seed stripper" inserts, i.e., inserts with different modulations or depressions used to dislodge excess seeds from the finger-pickups so that only a single seed is carried to the seed discharge opening in the backing plate. These removable inserts allow the farmer to easily switch-out the seed strippers and brushes depending on the various seed sizes to be planted without having to replace the entire backing plate. Additionally, the Sauder '758 patent discloses an improved seed discharge opening in the backing plate to reduce the potential for seed "skips" caused by the seeds ricocheting back into the seed meter after hitting the back panel of the seed belt housing.

Since eliminating seed skips caused by the seeds bouncing or ricocheting back into the seed meter after hitting the back panel of the seed belt housing is also one of the primary objects of the present invention, an understanding of the causes of such undesirable occurrences is necessary for an appreciation of the need for the improved seed belt housing of the present invention.

With reference to the written description and drawing figures of the above identified Hansen et al. '601 patent and Sauder '758 patent, both which are incorporated herein by reference, those skilled in the art should readily appreciate that the back wall of the seed belt housing is spaced approximately one inch to 1½ inches away from the back face of the backing plate of the finger-pickup seed meter. Those skilled in the art should also readily appreciate that the rotating fingers on the opposite side (i.e., the front face), of the backing plate of the finger-pickup meter are spring biased in order to hold the singulated seeds against the front face of the backing plate as the fingers rotate toward the seed discharge opening. Thus, due to this spring bias, as the fingers rotate past the seed discharge opening in the backing plate, the seeds are discharged through the seed opening with a force often sufficient enough for the seeds to bounce or ricochet back into the seed meter after hitting the back panel of the seed belt housing, thereby causing seed skips.

Accordingly, since finger-pickup type meters are one of the most widely used types of seed singulating devices on existing agricultural planters today, and since new planters are still being manufactured which utilize finger-pickup meters, there is a need in the industry for a simple, cost effective method of modifying or retrofitting existing planters without having to replace the entire seed meter and seed belt housing assembly to solve the above identified seed skip problems. Furthermore, there is a need in the industry for original equipment manufacturers (OEMs) to be able to offer new planters or replacement parts that will overcome the aforementioned seed skip problems encountered with current finger-pickup meters and seed belt housings.

BRIEF SUMMARY OF THE INVENTION

An improved seed belt housing to reduce seed skip and method for same. The seed belt housing having a modified back panel with an area of impact absorbing material disposed at least in the area where the seed normally hits the back panel of the seed belt housing after being discharged by the seed meter. The impact absorbing material having the properties to dampen, absorb, or reduce the amount of bounce or ricochet otherwise experienced by the seed after hitting the back panel of the seed belt housing.

In one embodiment the back panel of the seed belt housing assembly includes an opening or cutout in the area where the seed normally contacts the back panel of the housing after being discharged through the seed discharge opening in the backing plate of the adjacently disposed finger-pickup meter. The impact absorbing material is preferably secured against the back face of the back panel of the housing over the opening by an exterior cover plate.

In yet another alternative embodiment, an area of impact absorbing material is secured within a recessed area formed into the back panel of the housing.

In still another embodiment an area of impact absorbing material is formed integrally with the back panel of the housing.

In still another embodiment, the entire back panel is fabricated from an impact absorbing material.

The present invention may also be provided as a kit for retrofitting existing seed belt housings, comprising a template for positioning the opening to be cut into the back panel, a member of impact absorbing material sized to at least cover the opening to be cut in the back panel, and preferably an exterior cover plate for securing the impact absorbing material over the opening.

To the accomplishment of the above objectives, features and advantages, this invention may be embodied in the forms illustrated in the accompanying drawings, attention being called to the fact, however, that the drawings are illustrative only, and that changes may be made in the specific form illustrated and described within the scope of the appended claims.

DETAILED DESCRIPTION OF THE INVENTION

Figure 1:
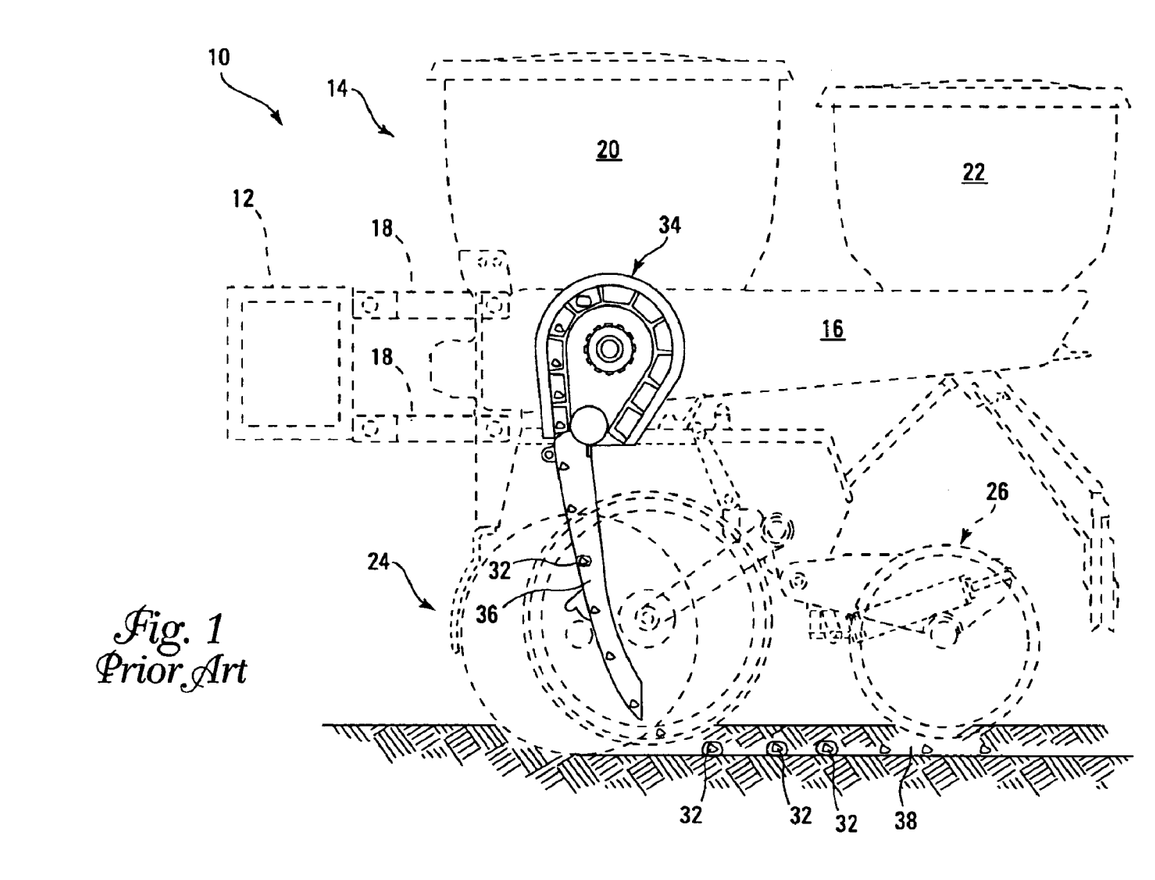
FIG. 1 is a side elevation view of a conventional agricultural planter showing the seed belt housing dispensing the singulated seeds received from a seed meter into the seed delivery tube.

Drawing FIG. 1 shows part of a typical agricultural planter 10, such as that disclosed in U.S. Pat. No. 4,009,668, which is incorporated herein by reference. As is conventional, the planter 10 includes a mobile main frame 12, only a portion of which is illustrated in FIG. 1. The main frame 12 is conventionally attached to and towed by a tractor (not shown) and a number of individual row units 14 are spaced at intervals along the main frame 12. Each row unit 14 includes a row unit frame 16, vertically adjustable relative to the main frame 12 by a parallel linkage 18. While only one row unit 14 is shown and described herein, the other row units on planter 10 are substantially the same. As is conventional, each row unit frame 16 supports a seed hopper 20, a fertilizer hopper 22, a furrow opening assembly 24 and a furrow closing assembly 26. Additionally, each row unit frame 16 supports a seed metering device 30, which selects and dispenses individual seeds 32 at regular intervals into a seed belt housing 34. In FIG. 1, the seed meter 30 is disposed behind the seed belt housing 34 and is therefore not visible. The seed belt housing 34 conveys the singulated seeds 32 downwardly a short distance where they are released into a seed tube 36, whereby the seeds are directed downwardly and discharged into the seed furrow 38.

Many planters, such as the John Deere 7000 and 7100 series planters, for example, utilize a type of seed meter 30 commonly referred to as a "finger-pickup" meter. As identified above, various commercial embodiments of finger-pickup meters have been widely used for many years on agricultural planters. Examples of some of the various embodiments of finger-pickup meters are disclosed in U.S. Pat. No. 3,308,774 to Keeton, U.S. Pat. No. 3,552,601 to Hansen et al. and U.S. Pat. No. 6,269,758 to Sauder. The specifications and drawings of each of these patents are incorporated herein by reference.

Figure 2:
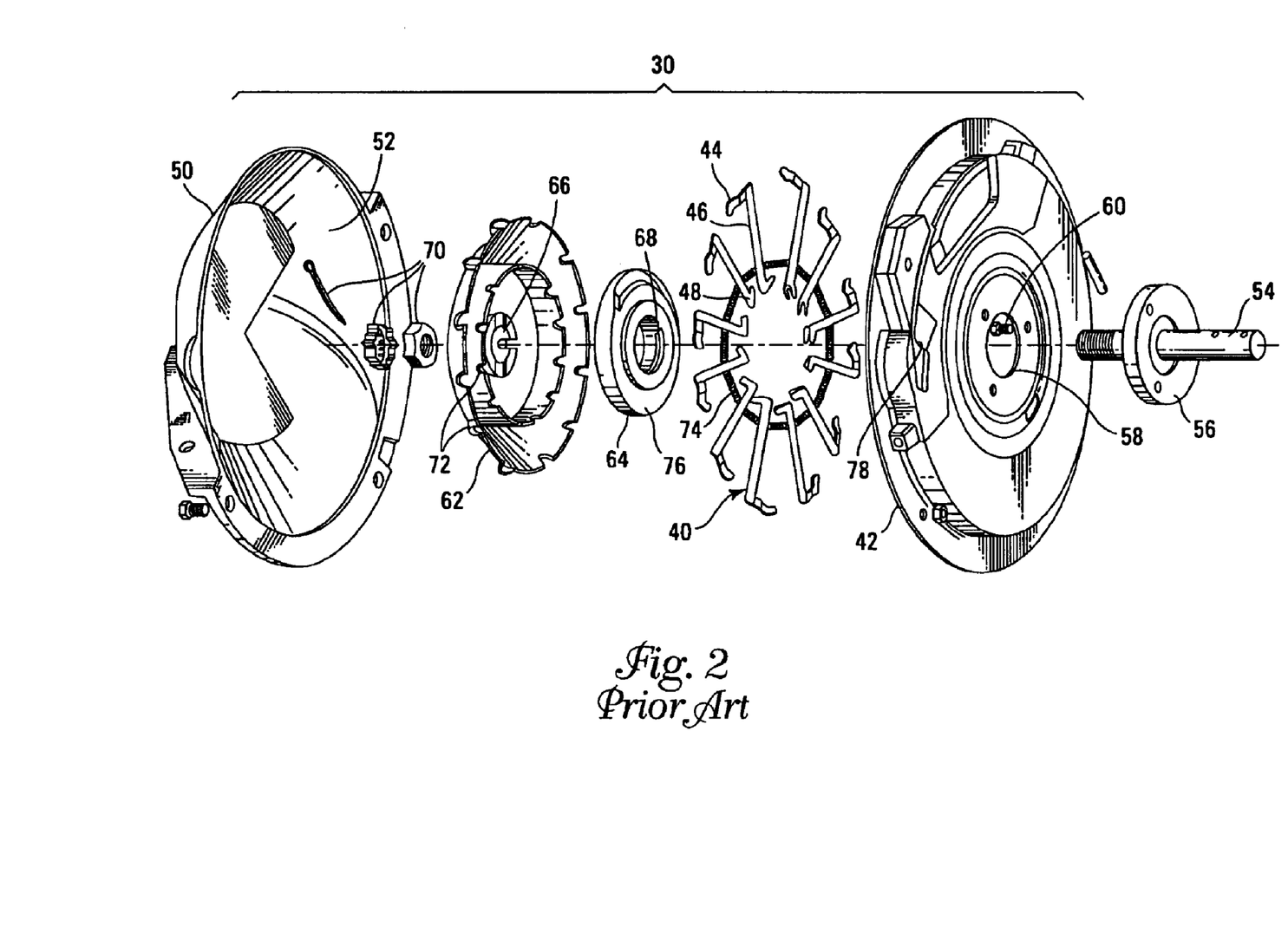
FIG. 2 is an exploded perspective view of a conventional finger-pickup meter.

Drawing FIG. 2 is an exploded perspective view of a typical finger-pickup meter 30 as disclosed in Hansen '601 and Sauder '758. It should be appreciated that although there are various commercial embodiments for finger-pickup meters and seed belt housings, each of these various commercial embodiments all operate in substantially the same manner. Therefore, the embodiments of the finger-pickup meter 30 and seed belt housing 34 shown in FIGS. 2 and 3 are intended to generally represent all such finger-pickup meters and seed belt housings.

As shown in FIG. 2, and as more thoroughly explained in Hansen '601 and Sauder '758, the finger-pickup meter 30 includes a seed selection mechanism in the form of a plurality of spring biased seed selecting fingers 40 which are mounted adjacent a stationary backing plate or wear plate 42 supported by the row unit frame 16. Each finger 40 has a seed engaging portion 44, an elongated cylindrical portion 46, and a cam follower portion 48. A cover 50, attaches to the backing plate 42 to enclose the seed selecting fingers 40 and to form a seed supply reservoir 52. The seeds in the seed supply reservoir 52 are received from the seed hopper 20 (FIG. 1) through a boot (not shown). A rotatable shaft 54 disposed within a bearing hub 56 extends through a central bore 58 in the backing plate 42. The bearing hub 56 mounts to the backing plate 42 with fasteners 60 as shown. The meter 30 further includes a rotatable finger guide 62 and a stationary cam member 64 each having a central bore 66, 68 respectively, to receive the rotatable shaft 54. The rotatable finger guide 62 is formed in the shape of a conical frustum and receives the stationary cam member 64. The finger guide 62 is secured to the rotatable shaft 54 such as by a nut, locking cap and cotter pin, designated generally at 70, such that the shaft 54 and finger guide 62 rotate together. The cam member 64 disposed within the finger guide 62, is restrained by the backing plate 42 and not rotate. The finger guide 62 includes a plurality of radial recesses 72 which receive the elongated cylindrical portion 46 of the fingers 40. The finger guide 62 in cooperation with the plurality of springs 74 secured to the fingers 40 biases the seed engaging portion 44 of the fingers against the backing plate 42. Thus, it should be appreciated that as the finger guide 62 rotates with the shaft 54, the spring biased fingers 40 rotate about the stationary cam member 64. The cam member 64 includes a beveled cam face 76 that is engaged by the cam followers 48 as the fingers 40 rotate. As the spring biased fingers 40 rotate over the beveled portion of the cam face 76, the seed engaging portion 44 of the fingers 40 are forced away from the backing plate 42. This beveled portion on the cam face 76 is disposed such that the seed engaging portion 44 of the fingers 40 are in the raised position as the fingers rotate through the seed reservoir 52 to allow the fingers 40 to capture a seed. As the cam followers 48 pass the beveled portion of the cam face 76, the biasing force of the springs 74 forces the finger 40 back against the backing plate 42, thus securely holding the seed between the seed engaging portion 44 and the backing plate 42. As the fingers 40 continue to rotate, the seed is slid along the backing plate 42 toward the seed discharge opening 78, through which the seeds are then forcibly ejected by the spring biased fingers 40.

Figure 3:
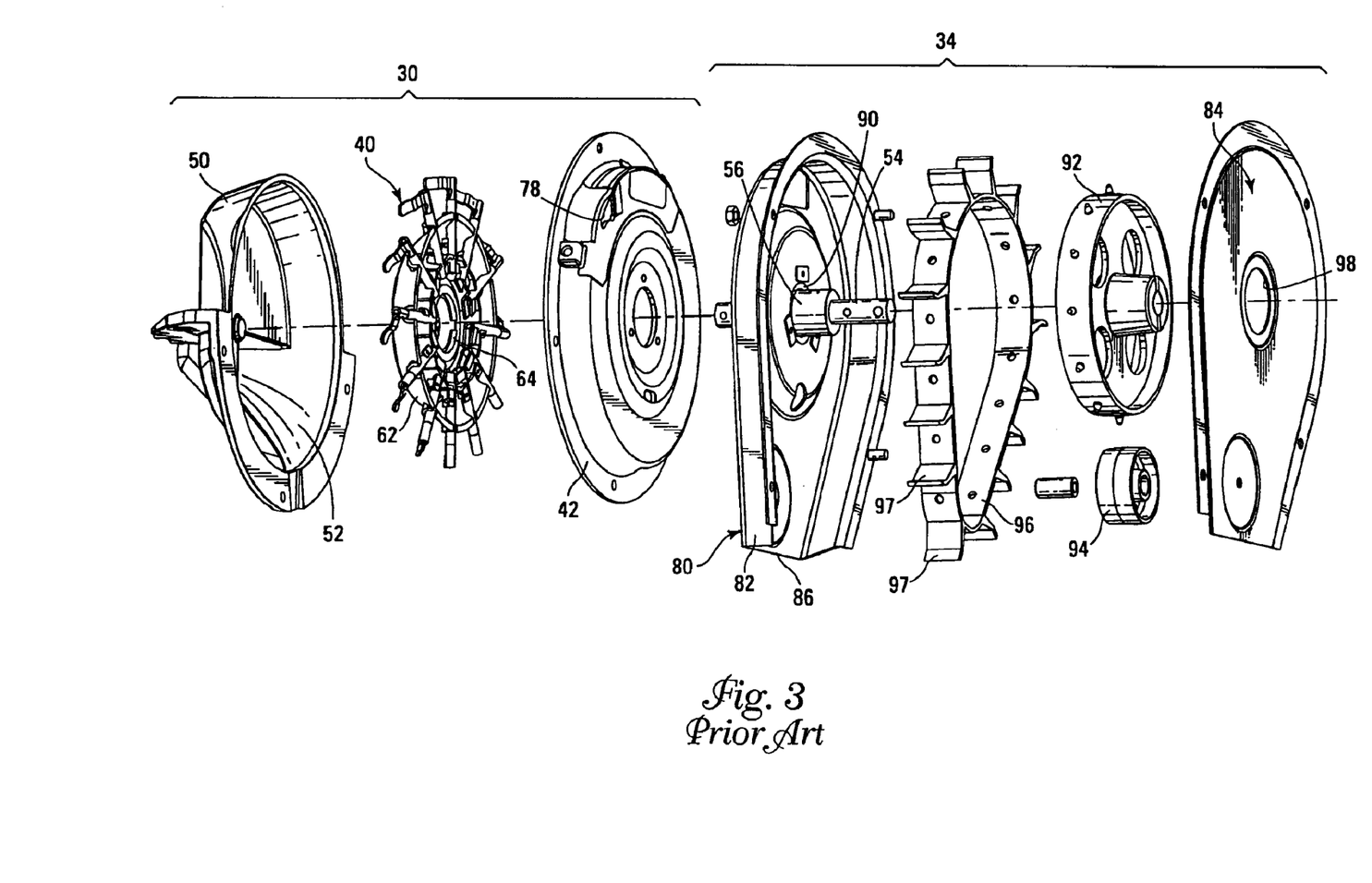
FIG. 3 is a perspective view of the partially assembled finger-pickup meter of FIG. 2 and an exploded perspective view of a conventional seed belt housing.

Refer now to FIG. 3, the finger-pickup meter 30 is shown partially assembled along with the adjacently disposed conventional seed belt housing 34, such as that disclosed in the John Deere 7000 and 7100 series MaxEmerge® Planting Units and Attachments Parts Catalog, which is incorporated herein by reference. The seed belt housing 34 is comprised of a front panel 80 having a flanged wall 82 extending about its entire periphery except at the lower end which is open. A substantially planar back panel 84 is secured by fasteners to the flanges of the peripheral wall 82, thereby forming an enclosure with an opening at a bottom end 86. The front panel 80 is disposed adjacent the backing plate 42 of the seed meter 30 and is mounted to the hub 56. The front panel 80 includes a seed receiving opening 88 (best viewed in FIG. 7) aligned with the seed discharge opening 78 of the seed meter 30 through which the singulated seeds 32 enter the seed belt housing 34. The front panel 80 further includes an aperture 90 for receiving the shaft 54. A drive pulley 92 is secured to the shaft 54 for rotation therewith. An idler pulley 94 is rotatably secured between the front and back panels 80, 84 as shown. A conveyor belt 96 is trained over the drive pulley 92 and idler pulley 94. The conveyor belt 96 includes a plurality of spaced apart, outwardly projecting flights 97 which form a plurality of individual compartments within the housing 34 for receiving the ejected seeds 32. The flights 97 convey the singulated seeds downwardly until they are discharged individually and in sequence into the seed tube 36 as shown in FIG. 1. The shaft 54 extends through an aperture 98 in the back panel 84. Typically, a sprocket 99 (FIG. 5) is secured to the end of the shaft 54. A chain (not shown) is mounted over the sprocket 99 and another sprocket (not shown) secured to a drive shaft (not shown) which may be driven by the ground-engaging wheels of the planter or by another drive means such as, for example, a hydraulically driven motor.

In operation, the spring biased fingers 40 capture a seed from the seed reservoir 52 (FIG. 2). The captured seed is held by the spring biased fingers 40 and slid along the backing plate 42 of the meter 30 until it is forcibly ejected by the spring biased fingers 40 through the seed discharge opening 78 in the backing plate 42 of the seed meter 30. The ejected seed enters the seed belt housing 34 through the opening 88 in the front panel 80 of the seed belt housing 34. Ideally, the seed 32 is then carried in its compartment between the flights 97 of the rotating conveyor belt 96 downwardly until the seed is released through the opening at the lower end 86 of the housing 34 and into the seed tube 36 as shown in FIG. 1.

The force at which the seed 32 is ejected from the meter 30 by the spring biased fingers 40 is often sufficient to cause the seed to hit the back panel 84 of the housing 34 with such force that the seed bounces or ricochets within the compartment between the conveyor flights 97 and the front and back panels 80, 84 of the housing 34. All too often, the ricocheting seed 32 will bounce back into the seed meter 30 through the opening 78 in the meter, thereby resulting in undesired seed skips in the furrow.

Figure 4:
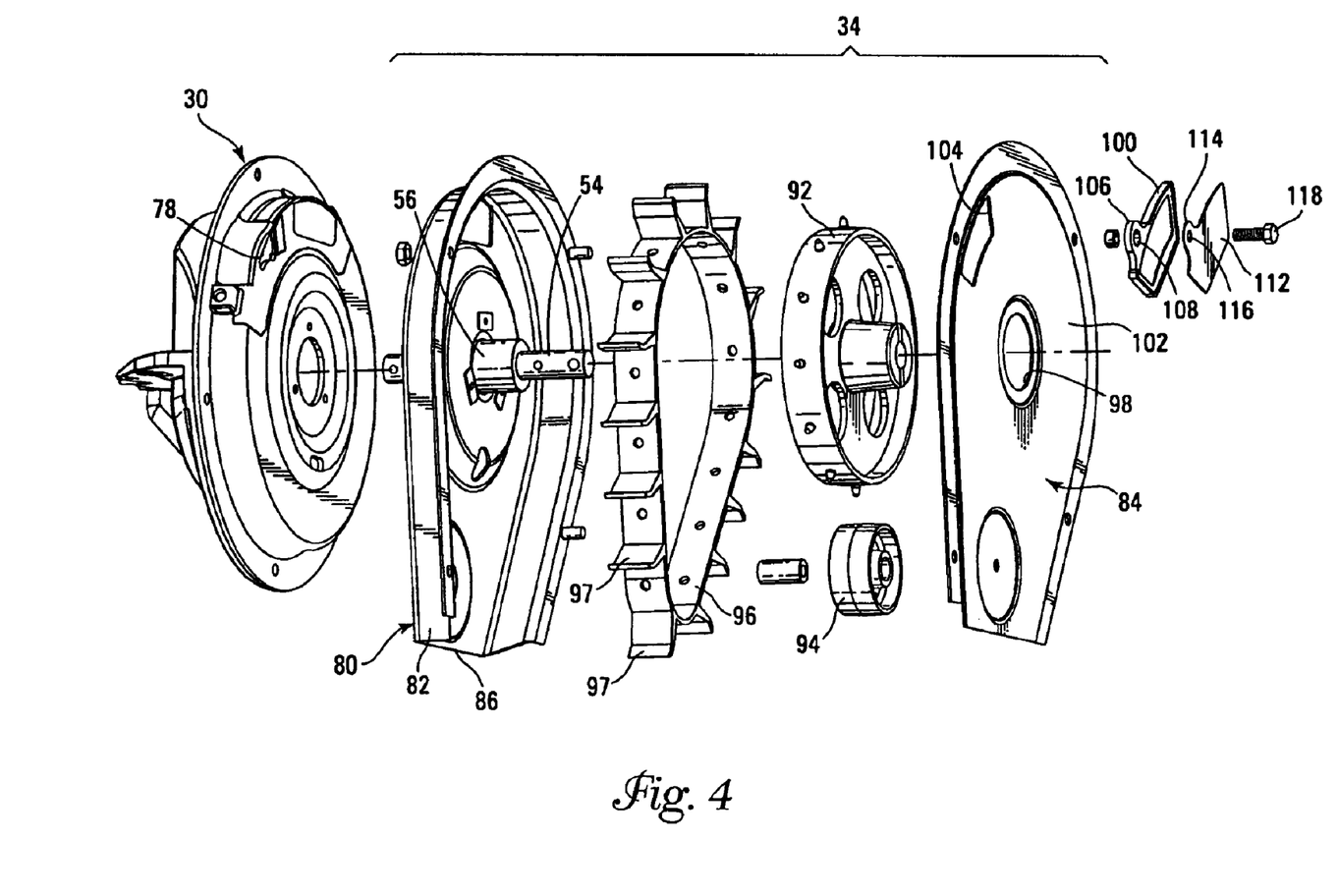
FIG. 4 is a perspective view of the assembled finger-pickup meter of FIG. 2 and an exploded perspective view of one embodiment of the improved seed belt housing of the present invention showing the impact absorbing material secured to the back face of the back panel of the seed belt housing.
Figure 5:
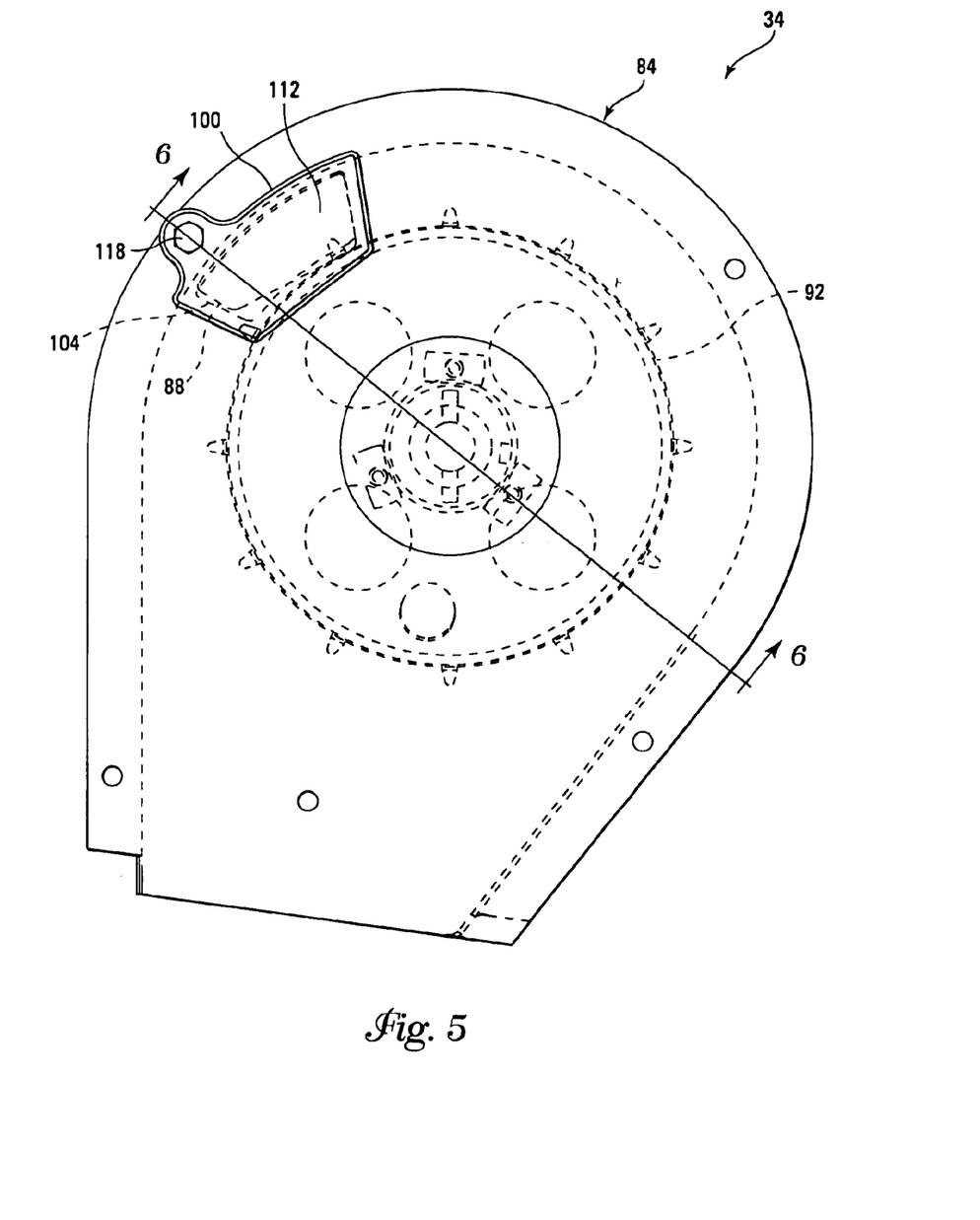
FIG. 5 is a side view of the improved seed belt housing of FIG. 4.
Figure 6:
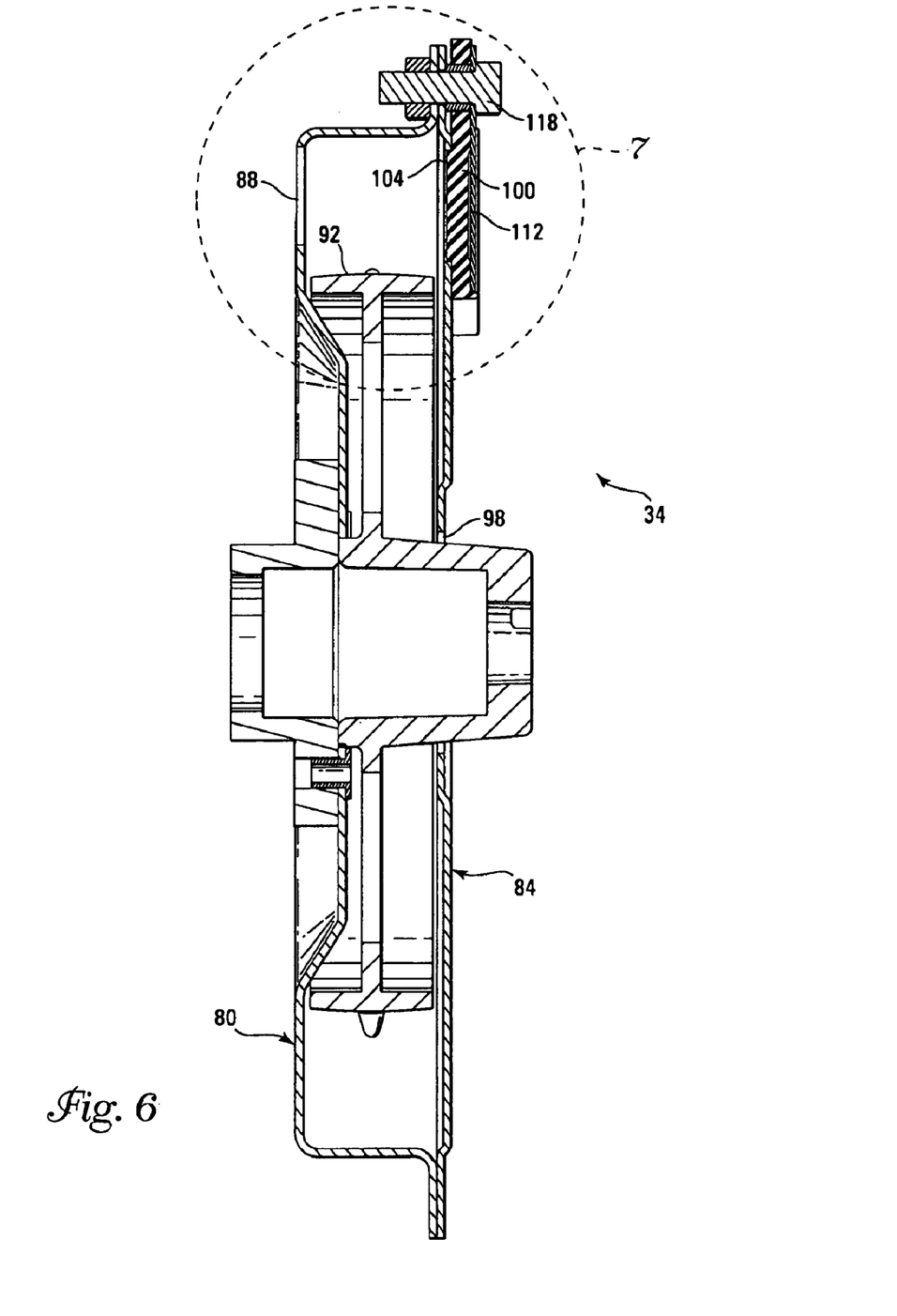
FIG. 6 is cross-sectional view of the improved seed belt housing as viewed along lines 6—6 of FIG. 5.
Figure 7:
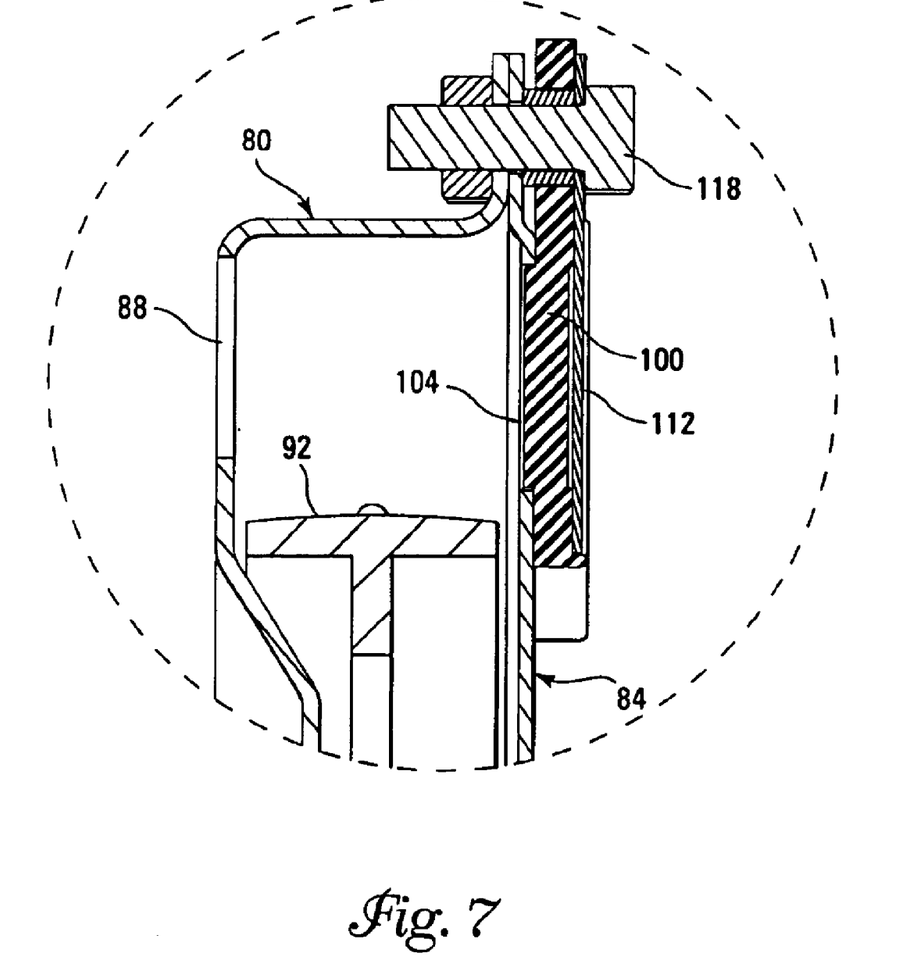
FIG. 7 is an enlarged view of a portion of FIG. 6.

Accordingly, the various embodiments of the present invention shown if FIGS. 4–8, as well as the other embodiments described herein, substantially reduce if not completely eliminate, the problem of seed skip resulting from seeds ricocheting back into the seed meter 30 after hitting the back panel 84 of the housing 34. Referring to FIGS. 4–7, the back panel 84 of the housing 34 is modified to provide an area of impact absorbing material 100 disposed on the back face 102 of the pack panel 84 over an opening 104 formed or cut in the back panel 84 of the housing 34 where the seed 32 would normally hit the back panel 84 after being ejected from the seed meter 30. FIG. 4 is an exploded perspective view of one embodiment of the present invention. FIG. 5 is a side elevation view of the embodiment of FIG. 4. FIG. 6 is a cross-sectional view as viewed along lines 6—6 of FIG. 5, and FIG. 7 is a detailed view of FIG. 6.

At the time of filing of this application, tests have shown that the best performing material for reducing seed ricochet is a compound identified as OM5220A-GBK4B flexible PVC, durometer of 55, available from Otech, Inc., 4744 East Oak Knoll Road, Rolling Prairie, Ind. 46371. Various other materials may perform equally or better than the preferred above identified impact absorbing material. Therefore, the present invention should not be construed as limited to the preferred impact absorbing material identified above.

Rather, the present invention is intended to include any type of material now known or later developed that is capable of dampening, absorbing, and/or otherwise reducing the amount of bounce or ricochet normally experienced by a seed after impacting a conventional backing plate 42, typically made of stamped or pressed steel or high density polymer material.

In the preferred embodiment of FIGS. 4–7, the impact absorbing material 100 preferably includes an ear 106 having an aperture 108 formed therein for receiving the threaded connector 110 normally used to secure the back panel 84 to the front panel 80 of the housing 34. An exterior cover plate 112 is preferably provided, though not necessary, to protect the impact absorbing material 100 from damage during installation and planting operations. The exterior cover plate 112 is preferably provided with a mating ear 114 having a mating aperture 116 therein to receive the fastener 118, thereby completely covering the impact absorbing material 100 and providing an easy means of attachment without requiring additional fasteners for securing to the back panel 84.

In other alternative embodiments, the impact absorbing material 100, with or without the cover plate 112, may simply be secured over the opening 104 to the back face 102 of the back panel 84 by an adhesive, tapping screws, clips, or any other well known means of securing.

In the embodiments shown in FIGS. 4–7, the present invention may also be provided as a kit comprising a template for positioning, scribing and cutting the opening 104 into the back panel 84, along with a precut piece of impact absorbing material 100 with or without the preferred exterior cover plate 112.

Figure 8:
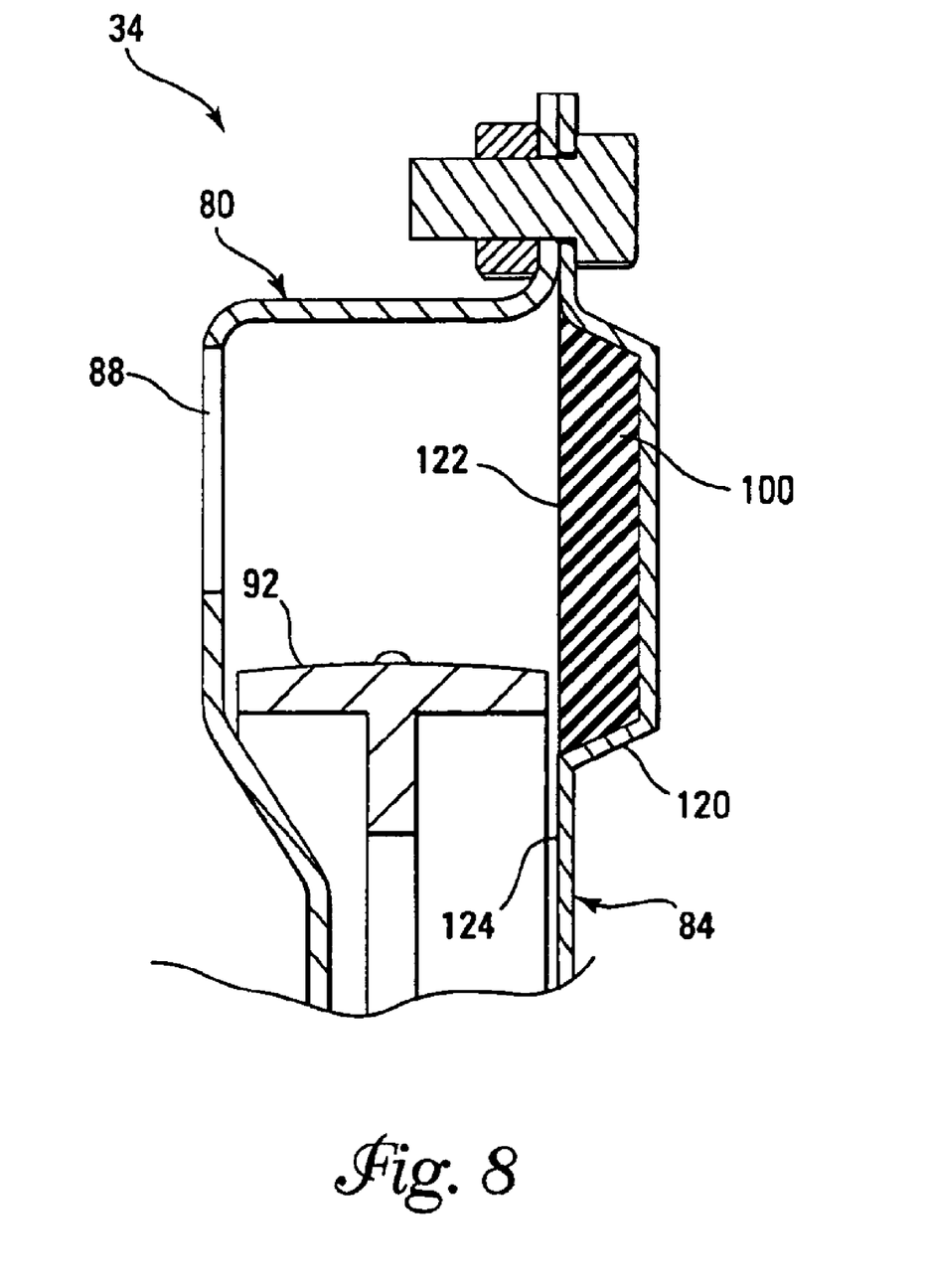
FIG. 8 is another alternate embodiment of the improved seed belt housing of the present invention with the impact absorbing material secured within a recess formed in the back panel.

In yet another alternative embodiment as shown in FIG. 8, the back panel 84 may be formed or stamped with a recess 120 of sufficient depth so as to receive the impact absorbing material 100 with the front face 122 of the impact absorbing material 100 substantially flush with the front face 124 of the back panel 84 of the housing 34, such that the impact absorbing material 100 does not interfere with the rotation of the flighted conveyor belt 96.

In yet another alternative embodiment, the back panel 84 may be fabricated with an area of impact absorbing material formed integrally with the back panel 84. In still another embodiment, the entire back panel 84, may be fabricated from an impact absorbing material.

Although only certain exemplary embodiments of the invention have been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. An improved seed belt housing adapted to be disposed adjacent a finger-pickup seed meter, wherein the seed belt housing includes a front panel having a seed receiving opening through which seeds discharged by the finger-pickup seed meter are received, the seed belt housing further including a back panel having an area spaced in opposition to the seed receiving opening against which the seeds discharged by the finger-pickup seed meter normally impact and ricochet therefrom, the improvement comprising:

an impact absorbing member disposed at least at the area where the seeds normally impact the back panel and ricochet therefrom, wherein said impact absorbing member substantially reduces the seed ricochet otherwise normally experienced when seeds discharge by the finger-pickup seed meter impact the back panel of the seed belt housing without said impact absorbing member.

2. The improved seed belt housing of claim 1 wherein the back panel includes an opening at least at the area where the seeds normally impact the back panel and wherein said impact absorbing member is secured to a back face of the back panel over said opening.

3. The improved seed belt housing of claim 2 further comprising an exterior cover secured over said impact absorbing member.

4. The improved seed belt housing of claim 1 wherein the back panel includes a recess in a front face of the back panel at least at the area where the seeds normally impact the back panel and wherein said impact absorbing member is disposed in said recess.

5. The improved seed belt housing of claim 1 wherein the impact absorbing member is integral with the back panel at least at the area where the seeds normally impact the back panel.

6. The improved seed belt housing of claim 1 wherein the impact absorbing member substantially comprises the back panel.

7. A method to reduce seed ricochet within a seed belt housing adapted to be disposed adjacent a finger-pickup seed meter; wherein the seed belt housing includes a front panel having a seed receiving opening for receiving seeds discharged by the finger-pickup seed meter, the seed belt housing further including a back panel having an area spaced in opposition to said seed receiving opening against which the seeds discharged by the finger-pickup seed meter normally impact and ricochet therefrom, the method comprising:

providing an impact absorbing member disposed at least at the area where the seeds normally impact the back panel, wherein said impact absorbing member substantially reduces the seed ricochet otherwise normally experienced when seeds discharged by the finger-pickup seed meter impact the back panel of the seed belt housing.

8. The method of claim 7 further comprising:

securing said impact absorbing member to a back face of the back panel over an opening in the back panel at least at the area where the seeds normally impact the back panel.

9. The method of claim 8 further comprising cutting said opening in the back panel at least at the area where the seeds normally impact the back panel.

10. The method of claim 8 further comprising:

securing an exterior cover over said impact absorbing member.

11. The method of claim 7 further comprising:

securing said impact absorbing member within a recess in a front face of the back panel at least at the area where the seeds normally impact the back panel.

12. The method of claim 11 further comprising:

forming said recess in a front face of the back panel at least at the area where the seeds normally impact the back panel.

13. The method of claim 7 further comprising:

integrally forming said impact absorbing member with the back panel at least at the area where the seeds normally impact the back panel.

14. The method of claim 7 wherein the back panel substantially comprises the impact absorbing member.

15. A method for modifying an existing seed belt housing adapted to be disposed adjacent to a finger-pickup seed meter to reduce seed skip, the method comprising the steps of:

providing a template adapted for positioning against a back panel of the seed belt housing, said template defining an area of the back panel of the seed belt housing where seeds discharged by the finger-pickup seed meter normally impact the back panel;

positioning said template against the back panel of the seed belt housing;

removing said area of the back panel defined by said template;

providing an impact absorbing member;

securing said impact absorbing member over said removed area;

whereby in use, said impact absorbing member so disposed substantially reduces seed ricochet otherwise normally experienced when seeds discharge by the finger-pickup seed meter impact the back panel, thereby reducing seed skip.

16. A seed selecting and dispensing mechanism comprising:

a finger-pickup seed meter having a backing plate with a seed discharge opening therein, said finger-pickup seed meter adapted to select individual seeds from a seed reservoir and discharge said individual seeds through said seed discharge opening in said backing plate;

a seed belt housing adapted to receive said individual seeds discharged from the finger-pickup seed meter and to convey said seeds, individually and in sequence, for dispensing into a seed tube, said seed belt housing including;

a front panel having a seed receiving opening substantially aligned with said seed discharge opening in said backing plate through which seeds discharged by said finger-pickup seed meter are received;

a back panel with an area spaced in opposition to said seed receiving opening, said back panel having an impact absorbing member disposed at least at said area in opposition to said receiving opening, whereby said impact absorbing member substantially reduces seed ricochet otherwise normally experienced when seeds discharge by the finger-pickup seed meter impact the back panel.

17. The seed selecting and dispensing mechanism of claim 16 wherein said impact absorbing member is secured to a back face of said back panel over an opening in said back panel at least at said area in opposition to said seed receiving opening.

18. The seed selecting and dispensing mechanism of claim 17 further comprising an exterior cover secured over said impact absorbing member.

19. The seed selecting and dispensing mechanism of claim 16 wherein said back panel includes a recess in a front face of said back panel at least at said area in opposition to said seed receiving opening and wherein said impact absorbing member is disposed in said recess.

20. The seed selecting and dispensing mechanism of claim 16 wherein the impact absorbing member is integral with said back panel at least at said area in opposition to said seed receiving opening.

21. The seed selecting and dispensing mechanism of claim 16 wherein said impact absorbing member substantially comprises said back panel.

* * * * *